Feb. 9, 1954

L. LANDAU 2,668,329

PRODUCTION OF RUBBER PRODUCTS HAVING AN
ANNULAR RIM SUCH AS VAGINAL DIAPHRAGMS

Filed June 24, 1949

INVENTOR
Lucian Landau

BY *[signature]*
his ATTORNEYS

Patented Feb. 9, 1954

2,668,329

UNITED STATES PATENT OFFICE 2,668,329

PRODUCTION OF RUBBER PRODUCTS HAVING AN ANNULAR RIM SUCH AS VAGINAL DIAPHRAGMS

Lucian Landau, Chingford, London, England, assignor to Latex Industries Limited, London, England, a British company Application June 24, 1949, Serial No. 101,265

Claims priority, application Great Britain June 28, 1948

3 Claims. (Cl. 18—59)

This invention relates to the reinforcement of rubber rings for the purpose of augmenting the resistance of such rings to distortion while retaining or enchancing their resiliency. Such reinforcement is often required in the production of surgical appliances such as, for instance, pessaries, and the invention will be described with relation to the production of pessaries though it is to be understood that it is applicable wherever a rubber ring is required which will give readily to a distorting pressure but on release will spring back readily to its normal shape.

In the production of pessaries having a beaded rim, the rim has consisted in a resilient spring embedded into the rubber ring forming the beaded edge, and for this purpose a watch spring has been employed but difficulties have been experienced in finding some ready means of forming the rubber ring round a flat spring, such as a watch spring. To overcome these difficulties it has been proposed to employ a spiral spring formed into a circle and to roll the rubber round the spring in a manner similar to the formation of a beaded edge, but it is found that such spiral springs have a tendency when depressed to form into a figure eight, which would defeat the object of the reinforcement which is to enable the ring to be depressed more or less flat so that when in position it will spring readily into its original circular or oval shape.

The present invention is applicable to a reinforcement consisting of either a flat spring such as a watch spring or a spiral spring with equally good results.

According to the invention, a method for the production of resilient metal reinforced rubber rings comprises supporting a metal spring coiled into a closed circle of the required diameter centrally within an annular moulding space suitably dimensioned to accommodate the spring and permit of a coating of the required thickness to be deposited thereon when the mould is filled with rubber, filling the moulding space with an unvulcanised rubber composition, and vulcanising the rubber.

One method of supporting the spring within the annular shaped mould, which is specially applicable where a flat spring coiled into a closed circle of the required diameter is employed as the reinforcing means, is the provision of grooved projections in the mould for holding the spring centrally within the moulding space.

In carrying out the invention with such a mould after the spring has been placed in position on the grooved projections, the mould is filled with a vulcanisable rubber composition (for example, by injection under pressure), and the rubber composition, while it is in the mould, is vulcanised partially. In this way a ring is obtained which is coated with rubber except in the places where the spring is resting upon the projections in the mould. The bare spaces in the ring will then be covered by dropping it into a mould with a slightly larger annular space than the previous mould and moulding further rubber round the ring and completing the vulcanisation.

According to another feature of the invention, instead of employing an annular shaped mould with grooved projections provided within the annular moulding space formed integrally with the mould, one or more supports may be introduced into the mould or attached to the spring, the said supports being made of partly or fully vulcanised rubber. When the reinforcement is inserted into the mould, it will be held in position by the rubber supports and when the mould is filled with a vulcanisable rubber composition and the rubber is then vulcanised, the supports will form an integral part of the rubber coating round the reinforcement.

It has been found in accordance with the invention that filling the inside of the spring with a solid cushion of rubber improves the stiffness and resiliency of the ring. Moreover, in this way the spring is less likely to break when deformed and should it accidentally break, it is less likely to perforate the outer layer of rubber.

In forming a pessary according to the invention, the reinforced rubber ring may be formed in situ by supporting the reinforcing spring (incompletely coated as above described) in the annular space forming the rim of the pessary mould and the rubber composition may then be injected into the mould filling all available space and the whole vulcanised together.

The invention will be further described with reference to the accompanying drawing in which.

Figure 4:
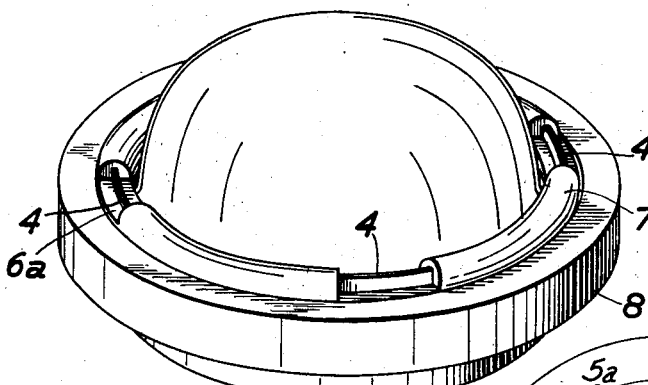
Figure 4 shows in perspective the moulding of Figure 2 in position in the lower half of a pessary mould.
Figure 1:
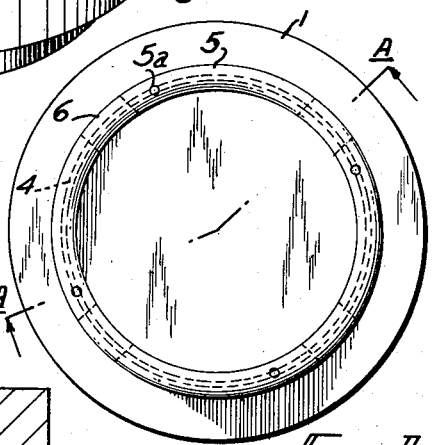
Figure 1 shows a plan view of a mould provided with integral supports for the spring.
Figure 2:
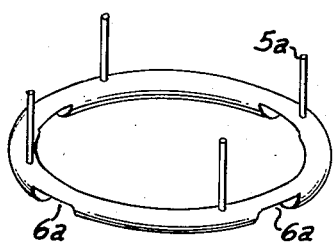
Figure 2 shows in perspective a moulding made in the mould of Figure 1.
Figure 5:
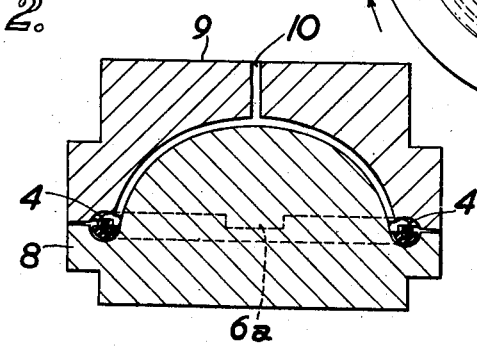
Figure 5 shows a section through the center of the pessary mould of Figure 4 with the top half of the mould in position ready for the second coating of the ring and simultaneous formation of the pessary.
Figure 3:
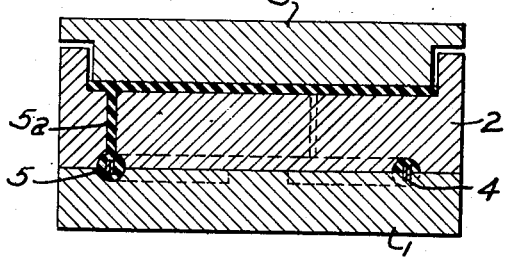
Figure 3 shows a vertical section along the line A—A of Figure 1 of the mould with a coiled watch spring in position after filling with rubber.

The following is an example of the production of a pessary by the method according to the feature of the invention illustrated in Figures 1 to 5. A watch spring 4⅛" wide is coiled into a circle of 2⅜" diameter with 4 turns, the two free ends being clamped together. This spring is then placed in a mould 1 having an annular space 5 of about 7/16" diameter with 4 grooved projections 6 on the bottom part of the mould to hold the coiled spring centrally within the annular space. The upper part of the mould 2 (Fig. 3) is spaced in position and a rubber composition is then injected into the mould by means of the plunger 3 through the feeding gates 5a, the mould being steam-heated to normal vulcanising temperature until the rubber is partially vulcanised, and the rubber covered spring removed from the mould. The rubber covered spring 7 which is shown in Fig. 2 with the bare parts 6a left by the supports 6 may be then transferred to a pessary mould 8 (Figure 4) having a rim slightly larger than the rubber covered spring and after placing the upper part 9 of the mould in position a rubber mix then injected into the mould under high pressure by means of a plunger (not shown) similar to 3 shown in Figure 3 through the gate 10 and the vulcanisation completed. The mix injected in the second stage of the method may conveniently be compounded to give a slightly faster curing than the mix employed for covering the spring so that the time required to finish the cure of the first moulding would be approximately the same as that for curing the second moulding. In this operation the exposed spaces 6a of the central spring core left by the projections 6 in the first mould become filled with the rubber composition which flows round the partially vulcanised rubber covered ring, building it up to form a rim to the rest of the moulding which in the final vulcanisation becomes an integral part of the finished article.

The present invention is not concerned with any particular composition for the moulding which is usually of high quality rubber mix but any of the synthetic elastomers having rubber-like properties may be employed in place of the rubber where the purpose for which the ring is to be employed permits of the use of such rubber-like materials. The term "rubber," therefore, in this specification and in the appended claims is to be considered as covering such materials, and similarly the word "vulcanising" and "partially vulcanising" is to be considered as covering polymerisation and incomplete polymerisation.

I claim:

1. A method of producing a rubber product having an annular rim reinforced with an annular coiled spring which comprises supporting the coiled spring centrally within an annular space in the mold upon firm supports projecting from the bottom of the mold space; injecting under pressure into the said molding space a vulcanizable rubber mix, and partly vulcanizing the rubber therein; removing the coated spring from the mold, and introducing it into an annular mold space of slightly larger cross-section than the first mold and injecting under pressure further vulcanizable mix into the said space containing the coated spring and completing the vulcanization in the mold.

2. A method as claimed in claim 1, wherein the spring is supported within the annular mold on supports which are formed integrally with the lower section of the mold and projecting from the bottom thereof.

3. A method of producing a vaginal diaphragm which comprises supporting an annular coiled spring centrally within a ring mold the annular cavity of which is of smaller cross-section than the rim cavity of the diaphragm mould, on firm supports projecting from the bottom of the mold cavity; injecting under pressure into said mold cavity a vulcanizable rubber mix and partly vulcanizing the rubber therein; removing the coated spring from the mold and introducing it into the annular mold cavity forming the rim of the diaphragm mold, filling the said mold with the rubber mix and completing the vulcanization in the mold whereby the coated spring becomes an integral part of the rim of the diaphragm.

LUCIAN LANDAU.

References Cited in the file of this patent

UNITED STATES PATENTS

| Number | Name | Date |
|---|---|---|
| 1,939,894 | Goodwin | Dec. 19, 1933 |
| 1,978,985 | Cobb | Oct. 30, 1934 |
| 2,064,435 | Loeffler | Dec. 15, 1936 |
| 2,252,758 | Clark, Jr., et al. | Aug. 19, 1941 |
| 2,279,208 | Shaw | Apr. 7, 1942 |
| 2,294,589 | Waterbury | Sept. 1, 1942 |
| 2,321,340 | Waterbury | June 8, 1943 |
| 2,361,348 | Dickson et al. | Oct. 24, 1944 |
| 2,422,266 | Steinke | June 17, 1947 |
| 2,452,752 | Hartranft | Nov. 2, 1948 |